United States Patent
Ortiz

[11] 3,908,301
[45] Sept. 30, 1975

[54] LEG SUPPORTED CRAB TRAP

[76] Inventor: Nilson V. Ortiz, 1064 S. Van Ness Ave., No. 4, San Francisco, Calif. 94110

[22] Filed: July 5, 1974

[21] Appl. No.: 486,140

[52] U.S. Cl. .................................................. 43/105
[51] Int. Cl.² ........................................ A01K 69/10
[58] Field of Search ..................... 43/102, 105, 100

[56] References Cited
UNITED STATES PATENTS

| | | | |
|---|---|---|---|
| 885,402 | 4/1908 | Thiaville | 43/105 |
| 2,163,973 | 6/1939 | Benca et al. | 43/100 |
| 2,196,928 | 4/1940 | Lile | 43/100 |
| 2,473,910 | 6/1949 | Ruiz | 43/105 |

FOREIGN PATENTS OR APPLICATIONS

| | | | |
|---|---|---|---|
| 1,280,730 | 11/1961 | France | 43/105 |

Primary Examiner—Warner H. Camp
Attorney, Agent, or Firm—Robert K. Rhea

[57] ABSTRACT

A wire frame base panel, having upwardly and inwardly directed crab trapping walls, is connected with an overlying wire frame top panel by flexible hoist strands connected with the base panel and entrained through the top panel for connection with a hoist line. A plurality of legs are connected with the top panel in downwardly diverging relation on opposing sides thereof for supporting the top panel in spaced relation with respect to the base panel, the legs being folded toward the depending surface of the top panel when not in use.

2 Claims, 5 Drawing Figures

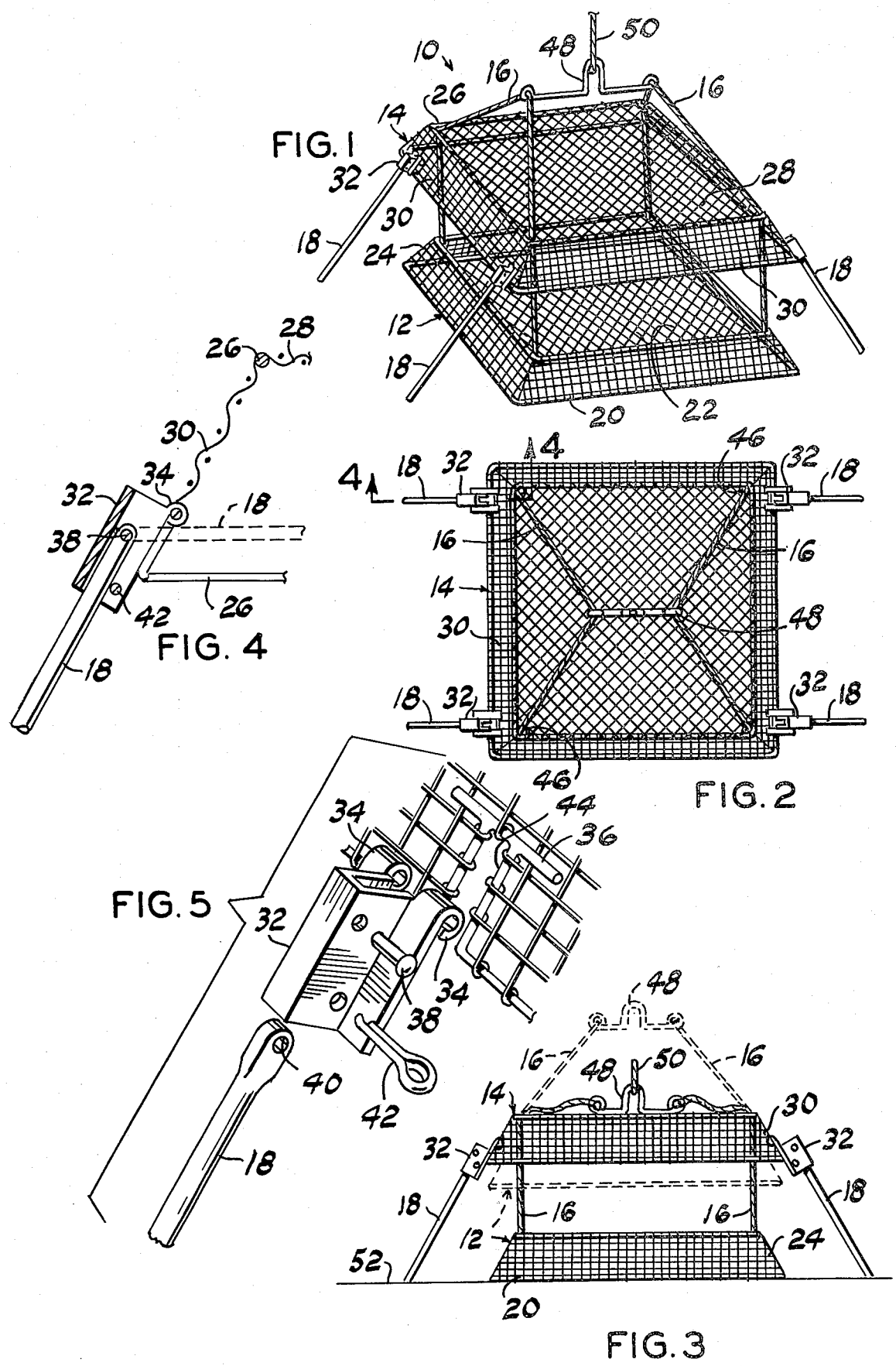

LEG SUPPORTED CRAB TRAP

BACKGROUND OF THE INVENTION

1. Field of the invention.

The present invention relates to crab traps and more particularly to an open frame wire mesh type collapsible trap.

2. Description of the prior art.

Crab traps are genrally constructed in two forms, noncollapsible and collapsible. The noncollapsible type, commonly called crab pots, are usually bulky, inconvenient to store and being of rigid construction have an opening through which a crab may enter in an effort to obtain bait placed in the pot with the opening arranged so that the crab cannot escape. Due to the bulk and the weight of such crab pots they are difficult to handle and frequently become damaged and require repair. Some of the collapsible type traps have the difficulty of their movable portions becoming bent or otherwise damaged thus failing to function properly in a closing or opening action when submerged. U.S. Pat. Nos. 3,427,742 and 3,678,612 disclose collapsible type traps.

SUMMARY OF THE INVENTION

A woven mesh sheet material supporting wire frame base is provided with upwrdly and inwardly inclined walls for trapping crabs which is secured, by flexible strands, in depending relation with respect to an overlying woven mesh sheet material supporting wire frame canopy-like top frame having downwardly and outwardly diverging walls nesting the crab trapping walls when the trap is in closed position. The flexible strands are connected with the base member and extend upwardly through the top member and are connected with a hoist line for disposing the base member adjacent the depending surface of the top member when the trap is supported by the hoist line. Legs are connected to opposing sides of the top member and project downwardly and outwardly to support the top in spaced relation above the base when in crab trapping position. The legs are folded toward the bottom surface of the top frame when the trap is not in use.

the principal object of this invention is to provide a lightweight woven mesh type crab trap which is supported in an open position by legs when submerged and the hoisting line is released.

BRIEF DESCRIPTION OF THE DRAWINGS

FIG. 1 is a perspective view of the trap in open position;

FIG. 2 is a top view of FIG. 1;

FIG. 3 is a side elevational view of the trap in operative position and illustrating, by dotted lines, the partially lifted position of the base member with respect to the top member;

FIG. 4 is a fragmentary cross sectional view taken substantially along the line 4—4 of FIG. 2 and illustrating one of the legs in folded position, by dotted lines; and, FIG. 5 is a fragmentary perspective view illustrating the leg connecting bracket and fragment of one leg in exploded relation with respect to a fragment of the top member side wall.

DESCRIPTION OF THE PREFERRED EMBODIMENT

Like characters of reference designate like parts in those figures of the drawings in which they occur.

In the drawings:

The reference numeral 10 indicates the trap, as a whole, which is substantially box-like in overall configuration when in open operative position, as illustrated in FIG. 1, it being understood that other configurations for the trap may be used, if desired. Basically the trap comprises a base member 12 and top member 14 interconnected by flexible strands 16 and supported by a pluraliity of legs 18. The base member 12 comprises a wire-like frame 20 which supports a normally horizontal section or sheet of woven mesh material to form a bottom panel 22 and define woven mesh covered upwardly and inwardly inclined walls 24 which are relatively short when compared with the outside dimensions of the bottom panel 22 for the purpose of trapping crabs which climb over the inwardly inclined walls when seeking bait placed on the bottom panel.

The top member 14 similarly comprises a wire frame 26 which supports a section of woven mesh material to form a top panel 28 parallel with respect to the bottom panel 22. The wire frame 26 also defines downwardly and outwardly diverging walls 30 of transversely greater dimension than the lower inwardly inclined walls 24 for the purposes presently explained.

The top member 14 is canopy-like in general configuration. The legs 18 are rod-like and are connected at one end in pairs to opposing sides of the downwardly directed walls 30 by brackets 32 so that the legs 18 diverge outwardly with respect to the bottom member 12 and support the top member 14 in spaced relation with respect to the bottom member when in trap open position (FIGS. 1 and 3). Each bracket 32 includes loop members 34 which surround respective ends of a bar 36 forming a part of the frame 26. Transversely the brackets 32 are substantially U-shaped in general configuration and are provided with a pin 38 extending transversely through the bracket and an aperture 40 formed in one end of the respective leg. A cotter pin 42 removably extends through the bracket for locking the respective leg in extended position. A slot 44, formed in the top frame 26, permits the respective leg to be pivoted toward the depending plane of the top member when the trap is not in use, as illustrated by dotted lines (FIG. 4).

The flexible strands 16 are connected at their respective ends to the bottom member frame 20 and extend upwardly through loops 46 forming a part of the top frame 26. A rod-like lifting link 48 is connected with the respective strands 16 above the upper limit of the top panel 28. A hoist line 50 is connected with the link 48. The purpose of the strands 16 is to lift the bottom member 12 into nesting relation within the top member when removing the trap from waters being fished.

OPERATION

In operation a quantity of bait, not shown, is placed on the bottom panel 22 and with the legs 18 extended, as shown by solid lines, the trap then is lowered into the water to be fished wherein, during the lowering action, the strands maintain the bottom member nested by the top member to insure that no bait is lost. When the trap reaches the bottom surface 52 of the body of water the depending ends of the legs 18 contacting the surface 52 support the top member and as the line 50 is payed out the bottom member 12 falls by gravity to lie on the surface 52 thus providing free access to the bait from all sides of the trap. After a predetermined period of time, the line 50 is lifted which lifts the bottom member 12 toward the depending surface of the top member 14, as illustrated by dotted lines (FIG. 3), thus insuring that no crabs trapped on the bottom panel by the wall 24 will escape as the entire trap is lifted out of the water.

Obviously the invention is susceptible to changes or alterations without defeating its practicability, therefore, I do not wish to be confined to the preferred embodiment shown in the drawings and described herein.

I claim:

1. A crab trap, comprising:
 a pair of superposed rectangular planar frames each having a section of woven mesh sheet material extending between and secured to its respective marginal edges;
 an inwardly and upwardly inclined endless woven mesh sheet material enclosure forming wall secured at its depending limit to the upper marginal edge surface of the lowermost said frame for forming a ramp permitting the entry of crabs to the enclosure;
 leg means secured in depending relation to the uppermost said frame for maintaining the latter in parallel spaced relation above the lowermost said frame when said frames are disposed on a substantially planar supporting surface
 a flexible hoist strand connected, at one end, with the respective marginal side of the lowermost frame and extending cooperatively upward through the woven mesh material of the uppermost said frame; and,
 a depending endless woven mesh material wall secured to the perimeter of the uppermost said frame in downwardly and outwardly diverging relation for contiguous contact with said enclosure forming wall when said frames are lifted by said strand.

2. The crab trap according to claim 1 in which said leg means includes:
 a plurality of elongated leg brackets substantially U-shaped in transverse section secured at one portion to said depending wall in downwardly and outwardly directed relation with the bight surface of the respective U-shape facing downwardly; and,
 a like plurality of rod-like legs pivotally secured within the U-shape of the respective said bracket for pivoting movement toward and away from the depending surface of the uppermost said frame.

* * * * *